May 29, 1934.  E. R. SMITH ET AL  1,961,091
SELF ADJUSTING STEADY REST
Filed Nov. 23, 1931
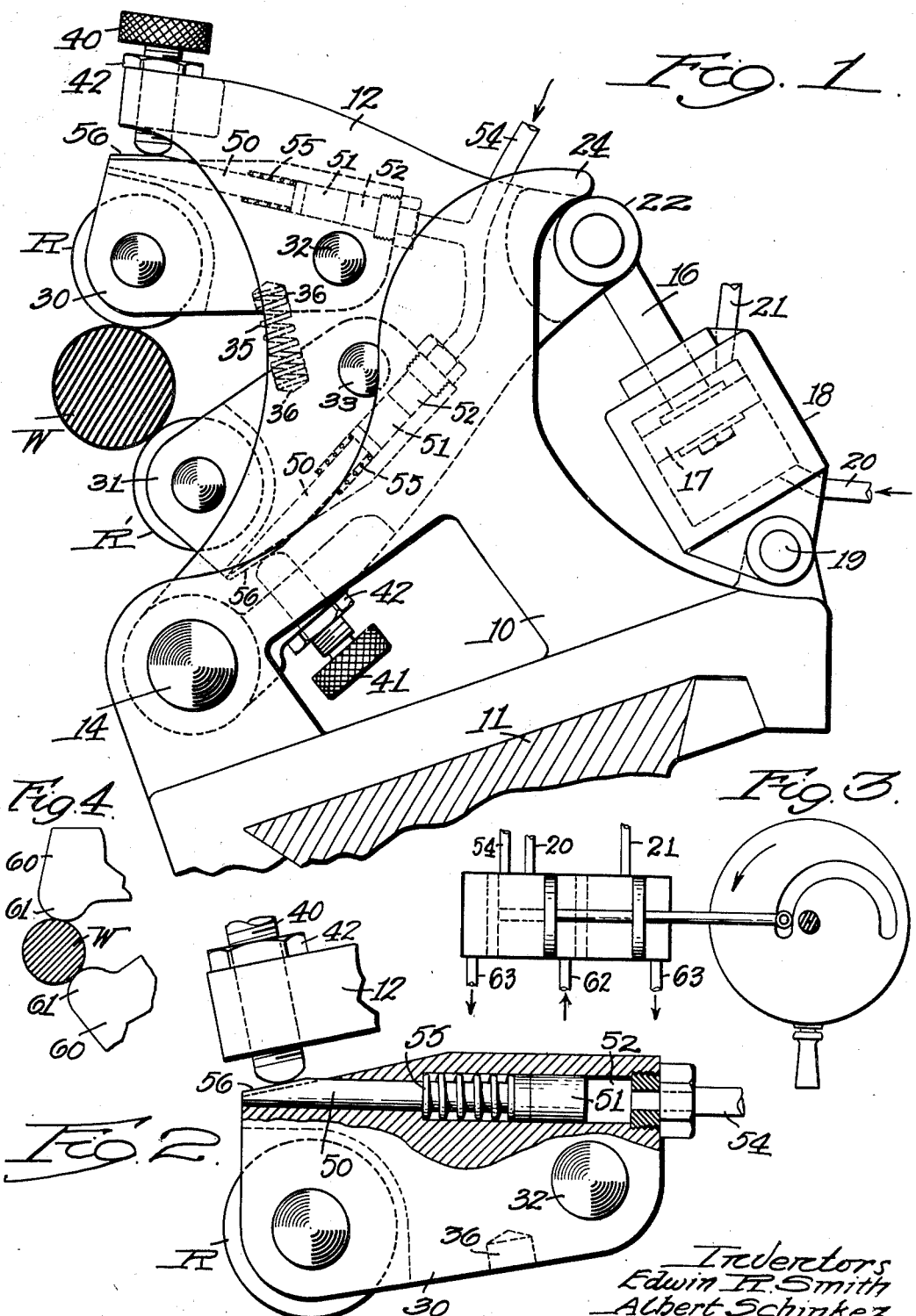
Inventors
Edwin R. Smith
Albert Schinkez
By attorneys
Southgate Fay + Hawley Patented May 29, 1934

1,961,091

UNITED STATES PATENT OFFICE 1,961,091

SELF-ADJUSTING STEADY REST

Edwin R. Smith and Albert Schinkez, Seneca Falls, N. Y., assignors to Seneca Falls Machine Company, Seneca Falls, N. Y., a corporation of Massachusetts Application November 23, 1931, Serial No. 576,830

12 Claims. (Cl. 82—38)

This invention relates to steady rests used for lathes and other machine tools. These steady rests are used to engage and support long shafts or other pieces of work near their center of length, and to prevent distortion of such long work by the pressure of the tool against the work during a machine operation.

Before a steady rest can be placed in use, it is necessary to provide the work with an accurately cylindrical bearing surface or "spot", with which the work-engaging members of the steady rest may engage. Unless these bearing surfaces or spots on successive work pieces are of exactly the same diameter, said members require accurate readjustment after each replacement of work, or the work will be sprung out of line and will be finished to a diameter different from that which is desired.

It is the object of our invention to provide an improved steady rest which will be self-adjusting over reasonable variations of work diameter and which will effectively support the work after self-adjustment relative thereto.

A further object of the invention is to provide means for bringing the work-engaging members yieldingly into engagement with the work, together with means for effectively preventing displacement of said members by any expected pressure of the work against said members.

Our invention further relates to the provision of improved devices for actuating the different movable parts of the steady rest.

A preferred form of the invention is shown in the drawing, in which

Fig. 1 is a side elevation of our improved steady rest;

Fig. 2 is a side elevation, partly in section, of one of the rolls and carriers;

Fig. 3 is a diagrammatic view of certain valve-operating mechanism to be described, and Fig. 4 shows a slight modification.

Referring to the drawing, we have shown our improved steady rest assembled on a stand or bracket 10 adapted to be secured in a desired longitudinal position on a guide-way 11 formed integral with, or rigidly secured to, the frame of a lathe or other machine tool on which the steady rest is to be used.

A movable support 12 is pivoted at 14 on the stand 10 and is connected by a rod 16 to a piston 17 in a cylindrical casing 18. The casing 18 is pivoted at 19 to the stand 10 and is provided with pipes 20 and 21 which may be selectively connected to a source of fluid pressure and to the exhaust or atmosphere as may be desired. A boss or projection 22 on the swinging support 12 engages a projection or horn 24 on the stand 10 and thus limits upward movement of the support when acted on by the piston 17.

A pair of rolls R and R' are mounted in roll holders or carriers 30 and 31 and engage the cylindrical bearing surface or spot on the work W when the device is in use. The carriers 30 and 31 are pivoted at 32 and 33 on the support 12 and are yieldingly forced apart by a spring 35 seated in pockets or recesses 36 in the adjacent faces of the carriers 30 and 31.

Adjustable stop screws 40 and 41 are threaded in portions of the support 12 and may be secured in adjusted position by the use of lock nuts 42. Plungers 50 are slidably mounted in guide-ways or bearings in the carriers 30 and 31 and are provided with piston heads 51 slidable in small cylinders 52 in the carriers.

The plungers 50 may be moved outward by admitting fluid under pressure to the cylinders 52 through piping 54, and the plungers may be withdrawn or moved inward by the action of springs 55 when the fluid pressure is relieved.

The outer end of each plunger 50 is beveled at 56 to provide an inclined surface engaging the rounded end of the adjacent stop screw 40 or 41. Each plunger 50 is thus in effect a wedge of relatively slight angle.

Having described the details of construction of our improved steady rest, the operation thereof is as follows:

Before a new piece of work is inserted, fluid under pressure is supplied to the pipe 21, and the pipes 20 and 54 are connected to the exhaust or atmosphere. Consequently the support 12 will be moved away from the work and the plungers 50 will be moved inward or withdrawn. After the work is inserted, pressure fluid will be admitted through the pipe 20 to advance the support 12 to operative position.

The screws 40 and 41 will then be adjusted so that the rolls R and R' approach the work W but are still far enough apart to freely admit a piece of work W of the greatest probable diameter at the bearing surface or spot. After the stop screws are thus adjusted and locked, pressure fluid is admitted through the pipe 54, thus advancing the wedge-shaped plungers 50 against the inner ends of the stop screws, which advance movement will continue until the rolls R and R' firmly engage the work W. The pressure applied through the pipe 54 is sufficient to cause firm engagement of the rolls with the work but is not sufficient to cause the rolls to bend or distort the work.

The parts remain in this position during the operation of the machine on the work, and the thrust of the tool is firmly resisted by the stop screws 40 and 41. The angle of the wedge-like surfaces 56 is too slight to effect any reverse or inward movement of the plungers by pressure applied against the rolls R and R'.

By the construction above described, we are thus able to advance the rolls R and R' against the work W with a definite pressure which will be substantially the same for work having spots with diameters varying within reasonable limits and the work will be centered about the same axis, regardless of the exact diameter of the spot or bearing surface.

When the work is completed, the pipe 54 is connected to the exhaust or atmosphere and the plungers 50 are withdrawn by springs 55.

In Fig. 3 we have indicated a hand-operated cam 60 by which a piston valve 61 may be moved to connect the pipes 20, 21 and 54 to a supply pipe 62 or to exhaust or to vent pipes 63 in predetermined order, so that the pipe 54 will be connected to the supply later than the pipe 20 and will be disconnected sooner.

We thus avoid the necessity for re-setting of the rolls for each new piece of work and we also avoid the necessity for exact uniformity in the diameters of the spots or bearing surfaces.

While the use of rolls to engage the work is desirable, non-rotary work-engaging members may be used in many instances, at the same time retaining the more important advantages of my invention. Such non-rotary members are indicated at 60 in Fig. 4, the work-engaging faces 61 being preferably hardened and polished.

Having thus described our invention and the advantages thereof, we do not wish to be limited to the details herein disclosed, otherwise than as set forth in the claims, but what we claim is:—

1. In a machine tool, a steady rest comprising a pair of members engaging the work at angularly spaced positions, means to give said members a preliminary advance movement toward the work to a selected position, additional means to yieldingly advance each member to engage the work, and means to prevent displacement of said members by normal pressure of the work applied thereto.

2. In a machine tool, a steady rest comprising a pair of members engaging the work at angularly spaced positions, means to give said members a preliminary advance movement toward the work to a selected position, additional means to yieldingly advance said members to engage the work with predetermined pressure, and means to positively prevent displacement of said members by pressure of the work applied thereto.

3. In a machine tool, a steady rest comprising a stand, a support movably mounted on said stand, a pair of work-engaging members, separate carriers for said members movably mounted on said support, means to advance and withdraw said support, means to limit such advance movement, and additional means to advance said members to engage the work, said latter means including wedge-shaped member-adjusting elements.

4. The combination in a machine tool as set forth in claim 3, in which the angle of said wedge-shaped elements is small and said elements are non-reversible in action.

5. The combination in a machine tool as set forth in claim 3, in which the means for moving said support and said adjusting elements is actuated by fluid pressure.

6. The combination in a machine tool as set forth in claim 3, in which the means for moving said support and said adjusting elements is actuated by fluid pressure and in predetermined order.

7. The combination in a machine tool as set forth in claim 3, in which provision is made for advancing the support before movement of the adjusting elements.

8. In a machine tool, a steady rest comprising a stand, a support movably mounted on said stand, a pair of steady rest rolls, separate carriers for said rolls movably mounted on said support, means to advance and withdraw said support, means to limit such advance movement, additional means to advance said carriers to cause said rolls to engage the work, and said advancing means operating in predetermined sequence on said support and carriers.

9. In a machine tool, a steady rest comprising means to engage the work at angularly spaced positions, operating means effective to yieldingly advance said first means toward work-engaging position, and additional mechanical means effective to interpose substantially non-yielding resistance to reverse movement of said work-engaging means.

10. In a machine tool, a steady rest comprising means to engage the work at angularly spaced positions, fluid-operated means effective to yieldingly advance said first means toward work-engaging position, and additional mechanical means effective to interpose substantially non-yielding resistance to reverse movement of said work-engaging means.

11. In a machine tool, a steady rest comprising a pair of members engaging the work at angularly spaced positions, and fluid-operated means to advance each member toward the work, said means including mechanical elements non-reversible by pressure of the work thereon and effective to positively prevent displacement of said members by pressure of the work thereon.

12. In a machine tool, a steady rest comprising a pair of members engaging the work at angularly spaced positions, and fluid-operated means to advance each member toward the work with predetermined pressure, said means including mechanical elements non-reversible by pressure of the work thereon and effective to positively prevent displacement of said members by pressure of the work thereon.

EDWIN R. SMITH.
ALBERT SCHINKEZ.